United States Patent
Skubacz et al.

(10) Patent No.: US 11,880,190 B2
(45) Date of Patent: Jan. 23, 2024

(54) METHOD AND PLATFORM FOR DEPLOYMENT OF AN INDUSTRIAL APPLICATION ON AN EDGE COMPUTING DEVICE OF A MACHINE TOOL

(71) Applicant: Siemens Aktiengesellschaft, Munich (DE)

(72) Inventors: Michal Skubacz, Gröbenzell (DE); Gunther Birk, Erlangen/Buckenhof (DE); Jan-Gregor Fischer, Zorneding (DE); Steffen Lamparter, Feldkirchen (DE); Maja Milicic Brandt, Munich (DE); Josep Soler Garrido, Munich (DE)

(73) Assignee: SIEMENS AKTIENGESELLSCHAFT

( * ) Notice: Subject to any disclaimer, the term of this patent is extended or adjusted under 35 U.S.C. 154(b) by 670 days.

(21) Appl. No.: 17/053,138

(22) PCT Filed: Apr. 25, 2019

(86) PCT No.: PCT/EP2019/060677
§ 371 (c)(1),
(2) Date: Nov. 5, 2020

(87) PCT Pub. No.: WO2019/219349
PCT Pub. Date: Nov. 21, 2019

(65) Prior Publication Data
US 2021/0240170 A1    Aug. 5, 2021

(30) Foreign Application Priority Data
May 18, 2018   (EP) .................................... 18173108

(51) Int. Cl.
G05B 19/418 (2006.01)
G06N 20/00 (2019.01)

(52) U.S. Cl.
CPC . *G05B 19/41825* (2013.01); *G05B 19/41845* (2013.01); *G06N 20/00* (2019.01);
(Continued)

(58) Field of Classification Search
CPC ..................... G05B 19/41825; G05B 19/41845
See application file for complete search history.

(56) References Cited

U.S. PATENT DOCUMENTS

| 8,732,658 | B2 | 5/2014 | Plache et al. | |
| 2019/0260827 | A1* | 8/2019 | Tajima | ................ H04L 47/2433 |
| 2022/0382264 | A1* | 12/2022 | Thon | ................ G05B 19/41885 |

FOREIGN PATENT DOCUMENTS

WO    WO 2017064560 A1    4/2017

OTHER PUBLICATIONS

Kjellberg T et al: "The machine tool model-A core part of the digital factory", CIRP Annals, Elsevier BV, NL, CH, FR, vol. 58, No. 1, pp. 425-428, XP026120299, ISSN: 0007-8506, DOI: 10.1016/J.CIRP. 2009.03.035 [retrieved on Apr. 1, 2009 O]; pp. 2, right-hand col. line 1-31; 2009.

(Continued)

*Primary Examiner* — Mark A Connolly
(74) *Attorney, Agent, or Firm* — Schmeiser, Olsen & Watts LLP (57) ABSTRACT

Provided is a deployment platform for deployment of an industrial application on an edge computing device, ECD, connected to the controller of a machine tool, MT, the deployment platform including a model management component, MMC, adapted to instantiate a generic machine tool model, GMTM, stored in a memory to provide a machine instance model, MIM, of the respective machine tool, MT, on the basis of a machine tool data report, MTDR, received by the model management component, MMC, from the edge computing device, ECD, of the respective machine tool, MT, and further adapted to convert generic data requirements, gR, of a generic industrial application into machine tool specific requirements, mtsR, using the machine instance model, MIM, of the respective machine tool, MT, wherein an instantiated industrial application for the machine tool, (Continued)

MT, is provided by instantiating the generic industrial application by extending its configuration data with machine tool specific requirements.

15 Claims, 9 Drawing Sheets

(52) U.S. Cl.
    CPC ............ *G05B 2219/31395* (2013.01); *G05B 2219/31459* (2013.01); *G05B 2219/34263* (2013.01)

(56) References Cited

OTHER PUBLICATIONS

Von Euler-Chelpin A: "Information modelling for the manufacturing system life cycle", Thesis, Stockholm : KTH, SE, pp. 1-131; 7-8, 29, 37, 42-50, 87-99, 114; figure 3.11; XP055524729; [retrieved on Nov. 19, 2018].
PCT International Search Report and Written Opinion of International Searching Authority dated Jun. 14, 2019 corresponding to PCT International Application No. PCT/EP2019/060677 filed Apr. 25, 2019.
European Extended Search Report dated Dec. 11, 2018 for Application No. 18173108.4.

\* cited by examiner

METHOD AND PLATFORM FOR DEPLOYMENT OF AN INDUSTRIAL APPLICATION ON AN EDGE COMPUTING DEVICE OF A MACHINE TOOL

CROSS-REFERENCE TO RELATED APPLICATIONS

This application claims priority to PCT Application No. PCT/EP2019/060677, having a filing date of Apr. 25, 2019, which is based on EP Application No. 18173108.4, having a filing date of May 18, 2018, the entire contents both of which are hereby incorporated by reference.

FIELD OF TECHNOLOGY

The following relates to a method and platform for deployment of an industrial application on an edge computing device connected to a controller of a machine tool within a manufacturing facility.

BACKGROUND

With the advent of cloud computing, industrial assets such as motors, robots, industrial equipment, automatization devices within a manufacturing facility can be connected to a cloud platform via agents such as IoT gateways. Digitalization and related technological developments such as internet of things, cloud computing and artificial intelligence can be used in manufacturing environments resulting in the emergence of smart factories where processes can be optimized by data-driven decision-making. In many cases, decisions have to be made close to the data sources to achieve short response times, to meet privacy concerns, and/or to handle large volumes of data. Accordingly, edge computing devices are co-located with the physical systems in the manufacturing environment. Yet, computing devices process data generated by the physical systems in order to provide value-added functions, in particular diagnostics, process monitoring and process optimization as well as preemptive maintenance, security monitoring and others. This can be based on multiple underlying technologies such as Complex Event Processing, Machine Learning or Reasoning.

These value-added functions can be typically deployed as re-usable software components, i.e. industrial applications. This forms an efficient approach whereby the core functionality is programmed only once and can thereafter be deployed to multiple manufacturing environments which can perform largely equivalent tasks. The manufacturing facility can comprise different machine tools controlled by an associated controller. For instance, a machine tool of the manufacturing environment can be provided for cutting metallic workpieces.

However, there are difficulties to achieve this vision due to the heterogeneity of the manufacturing environments, as tasks can be performed using different equipment configurations in each factory. For example, different families or versions of numerical controllers (even from different manufacturers) can be used. Further, machines can be configured in different ways (e.g. with a different number of axes).

Figure 1:
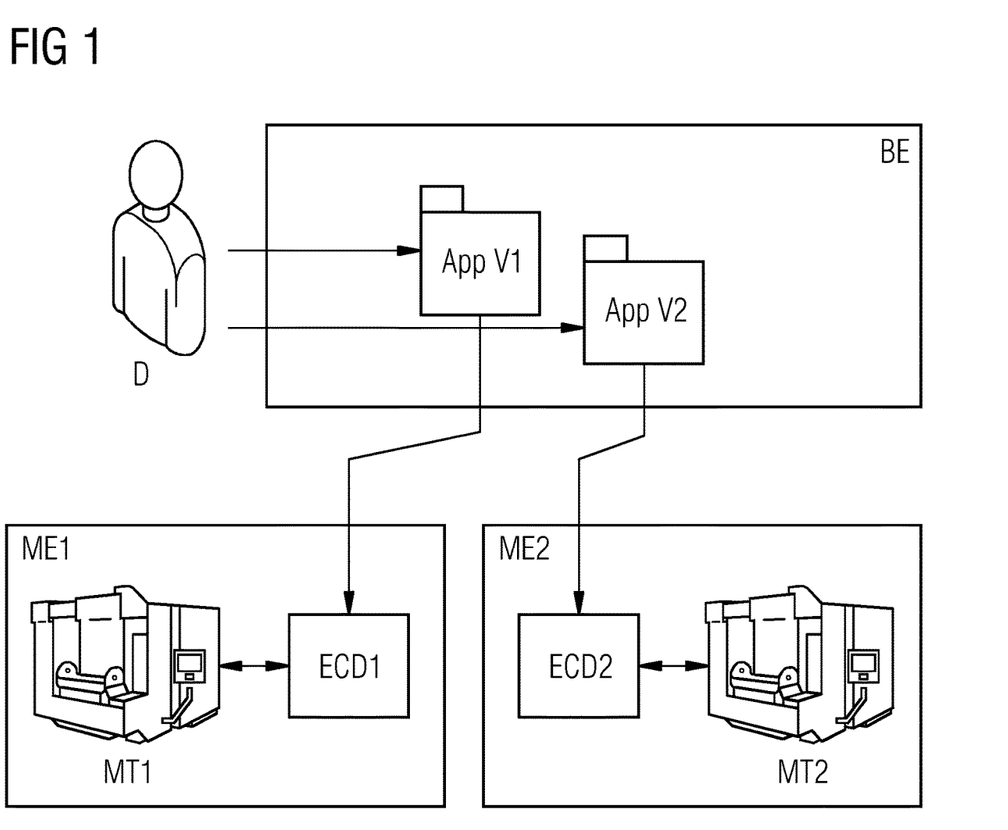
FIG. 1 illustrates schematically a conventional approach for deployment of an industrial application on an edge computing device.

This makes the creation of a generic application which can work on different manufacturing environments difficult. Until now, application developers can provide multiple versions of industrial applications which are suitable for different manufacturing environments as illustrated in FIG. 1. The user or developer D can publish different versions V1, V2 of the industrial application. In a typical setting, different manufacturing environments can be connected to a common set of remote (for example cloud-based) computing services, i.e. a so-called backend BE. The backend BE can provide different services common to all managed manufacturing environments. In this setting, an application developer or user D needs to make available (e.g. publish to the backend) different versions V1, V2 of an application APP suitable to different machine configurations. The backend BE can then decide which version of the industrial application is to be executed on a given manufacturing environment ME. The different versions of the published industrial application can be deployed on an edge computing device ECD of the respective manufacturing environment ME as also illustrated in FIG. 1. This conventional approach has the disadvantage that multiple versions of an industrial application need to be produced for different environments using different machine configurations of machines or machine tools MT within the manufacturing environment ME.

A more advanced conservative approach is to use standard protocols for industrial automation, such as OPC Unified Architecture (OPC-UA). Such a protocol can offer a unified addressing mechanism for data received from different types of devices. Under the assumption that all controllers of the machine tools MT implement such a common protocol, an app developer D can provide a single application for all manufacturing environments ME. However, by resorting to a common protocol to program generic applications, a number of limitations present themselves. The applications are not compatible with devices and machines using other protocols. This may make it impossible for applications to access all the data available in the manufacturing environment ME. Further, the applications are developed based on a-priori assumptions about the capabilities of the target manufacturing environments. For example, a generic, static information model may be used by the protocol. Moreover, there is no mechanism to make developers D aware of specific features of some of the potential target manufacturing environments ME such as data points or extra sensor devices. Further, the industrial applications are not aware of each other making it difficult for independent developers to incrementally build complex functionality based on other applications.

SUMMARY

An aspect relates to a method and platform which allow to deploy an industrial application without binding the application to a unique protocol or information model.

Embodiments of the invention provide according to the first aspect a method for deployment of an industrial application on an edge computing device connected to a controller of a machine tool, wherein the method comprises the steps of:
  providing a generic machine tool model of at least one of machine tool components, components configuration and dynamic data items,
  transforming a machine tool data report extracted by the edge computing device from the controller of the machine tool into a machine instance model of the machine tool instantiating the generic machine tool model,
  converting generic data requirements of a generic industrial application into machine tool specific requirements using the machine instance model of the machine tool,
  providing an instantiated industrial application for the machine tool by instantiating the generic industrial application by extending its configuration data with the machine tool specific requirements or by translating a subset or all requirements at runtime of the machine tool and deploying the instantiated industrial application on the edge computing device of the machine tool.

The method according to the first aspect of embodiments of the present invention allows for customization and extensions. It provides and maintains a common generic machine tool model GMTM which is extensible and can be used as a basis to develop industrial applications. This generic machine tool model GMTM can form a superset of the existing machine tool data standards and can provide a schema for describing drive parameters as well as kinematic transformations of the machine tool MT. The method can automate the deployment of generic industrial applications into specific manufacturing environments ME using different machines, configurations and data protocols. The method can automate the generation of instances of the generic machine tool model GMTM corresponding to specific manufacturing environments ME.

The method allows developers D to create generic industrial applications which can be deployed on multiple, heterogeneous manufacturing environments ME, fully leveraging the capabilities of those manufacturing environments, as well as the functionality provided by other applications. The possibility to create generic industrial applications for different manufacturing environments ME results in a significant increase in the efficiency and usability of the deployment platform.

In a possible embodiment of the method according to the first aspect of the present invention, the machine instance model of the machine tool is enriched with OEM specific data of an Original Equipment Manufacturer of the respective machine tool.

In a further possible embodiment of the method according to the first aspect of the present invention, the generic machine tool model and the machine instance models of the machine tools are stored in a memory or database of a model management component within a backend to which edge computing devices are connected.

In a still further possible embodiment of the method according to the first aspect of the present invention, the generic machine tool model provides a schema adapted to describe configurations of machine tool components, kinematics and associated data items.

In a still further possible embodiment of the method according to the first aspect of the present invention, the generic data requirements of the generic industrial application comprise queries.

In a possible embodiment of the method according to the first aspect of the present invention, the queries of the generic industrial application are evaluated by a query engine using the enriched machine instance model of the machine tool to generate query results forming machine tool specific requirements.

In a still further possible embodiment of the method according to the first aspect of the present invention, the generic data requirements of the generic industrial application converted into machine tool specific requirements using the enriched machine instance model of the machine tool comprise static data requirements converted at deployment time and dynamic data requirements converted during application runtime when the industrial application is executed on a processor of the edge computing device.

In a still further possible embodiment of the method according to the first aspect of the present invention, the machine tool data report extracted by the edge computing device from the controller of the machine tool comprises a predefined format including a controller specific data reporting format or an industrial standard format and comprises mappings from the predefined format to the generic machine tool model stored in the database of the model management component of the backend.

In a further possible embodiment of the method according to the first aspect of the present invention, the generic machine tool model stored in the memory or database of the backend is extended by a generic application model of the generic industrial application.

In a still further possible embodiment of the method according to the first aspect of the present invention, the machine instance model of the machine tool is enriched by applying rules specified in the generic industrial application.

In a still further possible embodiment of the method according to the first aspect of the present invention, the instantiated industrial application with its configuration data extended with the machine tool specific requirements are deployed on the edge computing device of the machine tool where the machine tool specific requirements and/or the generic data requirements are used by the edge computing device to acquire data from data sources of the machine tool via a machine tool interface of the edge computing device.

In a still further possible embodiment of the method according to the first aspect of the present invention, a copy of the machine instance model of a machine tool is stored in a local memory of the edge computing device of the respective machine tool wherein the machine instance model copy is used by the industrial application to convert generic data requirements into machine tool specific requirements.

In a still further possible embodiment of the method according to the first aspect of the present invention, the machine instance model copy is updated whenever the machine instance model of the machine tool stored in the memory or database of the model management component is changed.

In a still further possible embodiment of the method according to the first aspect of the present invention, data quality predicates are used to define dynamic data requirements of the industrial application with respect to data acquired by the edge computing device from data sources of the machine tool.

In a possible embodiment of the method according to the first aspect of the present invention, the data quality predicates comprise
  data acquisition frequency,
  probability of data correctness,
  data precision,
  data completeness,
  data currency,
  range of historic data availability; and
  data security constraints.

In a further possible embodiment of the method according to the first aspect of the present invention, generic data requirements of a generic industrial application expressed in terms of the generic machine tool model are converted into machine tool specific requirements including data points and/or data protocols of the machine tool and its controller as well as its edge computing device.

In a still further possible embodiment of the method according to the first aspect of the present invention, the instantiated industrial application is deployed on the edge computing device of the machine tool after it has been successfully checked that the machine tool specific requirements are fulfilled by the respective edge computing device.

Embodiments of the invention provide according to the second aspect a deployment platform for deployment of an industrial application on an edge computing device connected to the controller of a machine tool
the deployment platform comprising:
a model management component adapted to instantiate a generic machine tool model stored in a memory to provide a machine instance model of the respective machine tool on the basis of a machine tool data report received by the model management component from the edge computing device of the respective machine tool and further adapted to convert generic data requirements of a generic industrial application into machine tool specific requirements using the machine instance model of the respective machine tool,
wherein an instantiated industrial application for the machine tool is provided by instantiating the generic industrial application by extending its configuration data with machine tool specific requirements or by translating a subset or all requirements at runtime of the machine tool, wherein the instantiated industrial application is deployed by the model management component of the deployment platform on the edge computing device of the respective machine tool.

BRIEF DESCRIPTION

Some of the embodiments will be described in detail, with references to the following Figures, wherein like designations denote like members, wherein.

DETAILED DESCRIPTION

Figure 2:
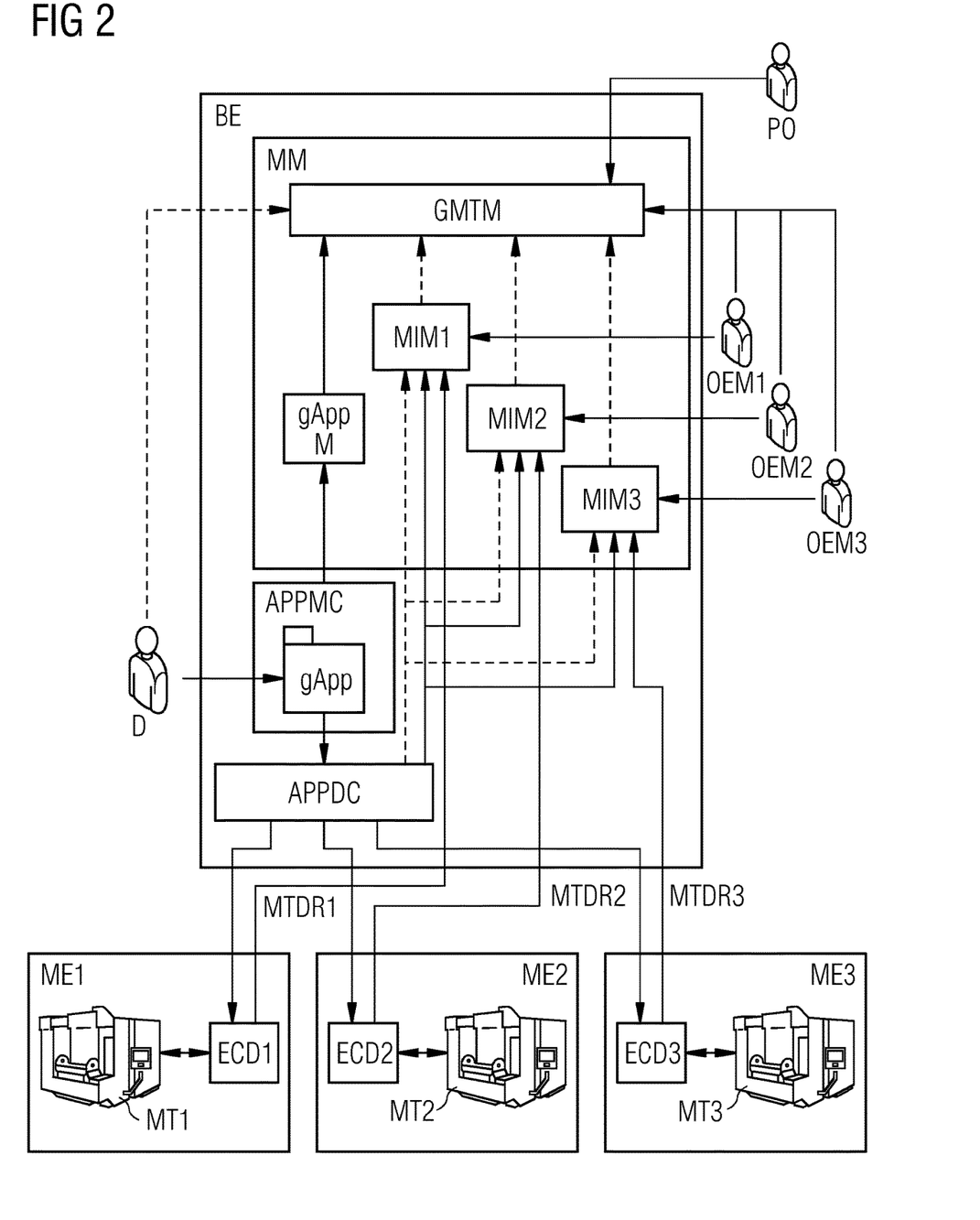
FIG. 2 shows a schematic diagram for illustrating a possible exemplary embodiment of a deployment platform for deployment of an industrial application on an edge computing device according to an aspect of the present invention.

FIG. 2 shows a schematic diagram for illustrating a possible exemplary embodiment of a method and platform used for deployment of an industrial application on one or more edge computing devices ECD of machine tools MT within a manufacturing facility. In the exemplary embodiment illustrated in FIG. 2, different manufacturing environments ME1, ME2, ME3 are connected to a common backend BE. Each manufacturing environment ME comprises at least one machine tool MT having a machine tool controller connected to the edge computing device ECD of the respective manufacturing environment. The machine tool MT can comprise mechanical components to process workpieces in the manufacturing process. The machine tool MT can be connected to at least one machine tool controller which is adapted to control the mechanical components of the machine tool. The machine tool controller comprises an interface to the edge computing device ECD of the manufacturing environment ME to exchange data.

The backend BE of the deployment platform comprises a model management component MMC adapted to instantiate a generic machine tool model GMTM stored in a memory or database of the platform. The model management component MMC is adapted to instantiate the stored generic machine tool model GMTM to provide a machine instance model MIM of the respective machine tool MT on the basis of a machine tool data report MTDR received by the model management component MMC from the edge computing device EDC of the respective machine tool MT. The model management component MMC of the backend BE is further adapted to convert generic data requirements gR of a generic industrial application into machine tool specific requirements mtsR using the machine instance model MIM of the respective machine tool MT. In the illustrated embodiment of FIG. 2, each edge computing device ECD is connected to a controller of a machine tool MT. In this specific embodiment, the edge computing device ECD and the machine tool MT form separate physical entities but are connected via a data interface. It is also possible that the edge computing device ECD is itself physically embedded into the machine tool MT, i.e. integrated with the other components of the machine tool MT such as the machine tool controller.

In a possible embodiment, the instantiated industrial application of the machine tool MT is provided by instantiating the generic industrial application gAPP by extending its configuration data with machine tool specific requirements mtsR. This is done if one choses to translate some of the generic data requirements gR to machine tool specific requirements mtsR. In an alternative embodiment, all requirements are translated at runtime of the machine tool MT. The instantiated industrial application for the machine tool MT is deployed by the model management component MMC of the backend BE on the edge computing device ECD of the respective machine tool MT. The deployment platform illustrated in FIG. 2 is adapted to perform a method for deployment of an industrial application on an edge computing device ECD connected to a controller of a machine tool MT within a manufacturing environment comprising in a possible embodiment the steps illustrated in FIG. 3.

Figure 3:
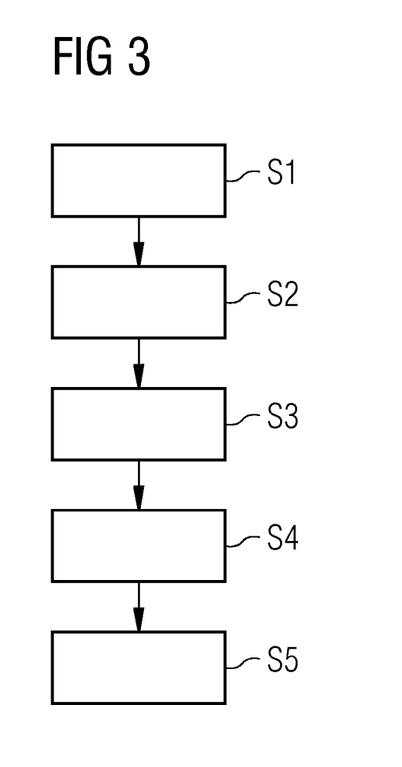
FIG. 3 shows a flowchart of a possible exemplary embodiment of a method for deployment of an industrial application on an edge computing device according to an aspect of the present invention.

In a first step S1, the generic machine tool model GMTM of machine tool components of the respective machine tool MT is provided and can be stored in a memory or database of the model management component MMC.

In a further step S2, a machine tool data report MTDR extracted by the edge computing device ECD from the controller of the respective machine tool MT is transformed into a corresponding machine instance model MIM of the machine tool MT by instantiating the generic machine tool model GMTM.

In a further step S3, generic data requirements gR of a generic industrial application gAPP can be converted into machine tool specific requirements mtsR using the machine instance model MIM of the machine tool MT provided in step S2.

In a further step S4, an instantiated industrial application is provided. In a possible embodiment, the instantiated industrial application is provided by instantiating the generic industrial application gAPP by extending its configuration data with machine tool specific requirements mtsR. Further, in an alternative embodiment, it is possible to translate a subset or all requirements at runtime of the machine tool MT.

In a final step S5, the instantiated industrial application can be deployed on the edge computing device ECD of the machine tool MT.

The machine instance model MIM of the machine tool MT generated in step S2 can be enriched in a possible embodiment with OEM specific data of an Original Equipment Manufacturer OEM of the respective machine tool MT as also illustrated in FIG. 2. The generic machine tool model GMTM stored in the database of the model management component MMC provides a schema adapted to describe configurations of machine tool components, their kinematics as well as associated data items. A platform owner PO of the deployment platform illustrated in FIG. 2 can generate and/or update the generic machine tool model GMTM. Generic data requirements gR of the generic industrial application can comprise queries Q. These queries Q can be evaluated by a query engine QE of the platform using the machine instance model MIM of the machine tool MT to generate query results QRs forming machine tool specific requirements mtsR. The machine instance model MIM can be enriched with OEM specific data by the OEM of the respective machine tool MT as also illustrated in FIG. 2.

The generic data requirements gR of the generic industrial application can be converted into machine tool specific requirements mtsR using the enriched machine instance model MIM of the machine tool MT. The machine tool specific requirements mtsR can comprise static data requirements converted at deployment time as well as dynamic data requirements converted during application runtime when the industrial application is executed on a processor of the edge computing device ECD of the manufacturing environment.

The machine tool data report MTDR extracted by the edge computing device ECD from the controller of the machine tool MT in step S2 can comprise in a possible embodiment a predefined format. This predefined format can include a controller specific data reporting format or an industrial standard format. The machine tool data report MTDR can also be accompanied by mappings from the predefined format to the generic machine tool model GMTM stored in the database of the model management component MMC of the backend BE.

In a possible embodiment, the generic machine tool model GMTM stored in the memory or database of the backend BE can be extended by a generic application model gAPPM of the generic industrial application gAPP as also illustrated in FIG. 2. In a possible embodiment, the machine instance model MIM of the machine tool MT provided in step S2 can also be enriched by applying rules specified in the generic industrial application.

The instantiated industrial application with its configuration data extended with the machine tool specific requirements mtsR can be deployed using the platform on the edge computing device ECD of the respective machine tool MT. The machine tool specific requirements mtsR and/or the generic data requirements gR can be used by the edge computing device ECD to acquire data from data sources of the machine tool MT via a machine tool interface of the edge computing device ECD.

In a possible embodiment, a copy of the machine instance model MIM of the machine tool MT can be stored in a local memory of the edge computing device ECD of the machine tool MT. The machine instance model MIM copy is then used by the industrial application to convert generic data requirements gR into machine tool specific requirements mtsR. Further, the machine instance model MIM copy stored in the local memory can be updated whenever the machine instance model MIM of the machine tool MT stored in the memory of the model management component MMC is changed.

In a possible embodiment, data quality predicates are used to define dynamic data requirements of the industrial application with respect to data acquired from the edge computing device ECD from the data sources of the machine tool MT. These data quality predicates can comprise a data acquisition frequency, probability of data correctness, data precision, data completeness, data currency, range of historic data availability as well as data security constraints.

The generic data requirements gR of the generic industrial application expressed in terms of the generic machine tool model GMTM can be converted into the machine tool specific requirements mtsR including data points and/or data protocols of the machine tool MT and its controller and its edge computing device ECD. In a possible embodiment, the instantiated industrial application is only deployed on the edge computing device ECD of the machine tool MT after it has been successfully checked that the machine tool specific requirements mtsR are fulfilled by the respective edge computing device ECD.

Figure 4:
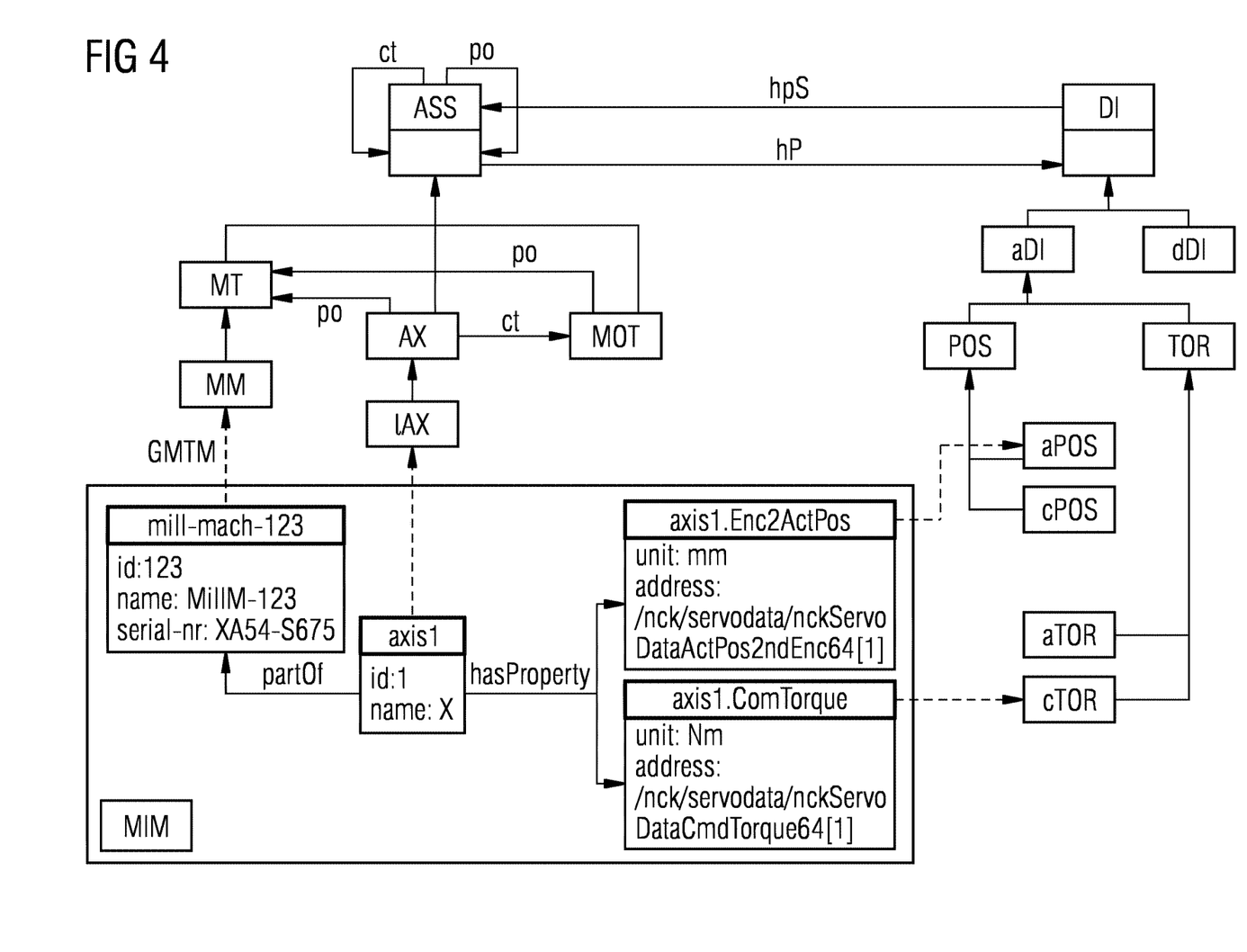
FIG. 4 shows schematically an example for a generic machine tool model with a machine instance model.

The generic machine tool model GMTM stored in the database of the model management component MMC within the backend BE provides a schema for describing machine tool components of the machine tool MT, their configuration as well as dynamic data. The generic machine tool model GMTM can comprise a repository of machine tool component classes (types), both physical and abstract, their attributes and their relationships such as subclass, partonomy and connectedness. An example of the generic machine tool model GMTM is also illustrated in FIG. 4. The generic machine tool model GMTM can comprise a repository of dynamic data item classes (types), both analog and discrete, their attributes and their subclass hierarchy as well as relationships with machine tool components. The generic machine tool model GMTM can comprise concepts and structure for specifying kinematic transformations of machine tool components. The generic machine tool model GMTM can support multiple hierarchies and is also extendable. The generic machine tool model GMTM stored in the database of the model management component MMC within the backend BE of the platform forms a superset of machine tool data standards such as OPC-UA Companions by MTConnect and VDW). The machine instance model MIM can define the configuration data and the dynamic data of a specific machine tool MT by the schema provided by the generic machine tool model GMTM. The machine instance model MIM describes the machine tool MT and its machine tool components as well as associated data items and can align them with the generic machine tool model GMTM. The dynamic data items are mapped to the machine specific addresses, either in the native controller/OEM (Original Equipment Manufacturer)-defined format or e.g. by the OPC-UA address space.

An exemplary fragment of the generic machine tool model GMTM and the machine instance model MIM is illustrated in FIG. 4. The generic machine tool model GMTM provides subclasses of the top class asset ASS to describe classes of machine tools MT and their machine tool components. In the illustrated example of FIG. 4, the machine tool MT is a subclass of asset ASS forming a top class. Further, in the illustrated example, a milling machine MM forms a subclass of machine tool MT. Further, axis AX is a subclass of asset ASS that is defined to be a part of (po) a machine tool MT. Moreover, linear axis lAX is a subclass of axis as shown in FIG. 4. Assets ASS have properties (hP) that comprise data items DI. The data items DI can be either analog data items aDI or discrete data items dDI as illustrated in FIG. 4. The actual position aPOS is a subclass of position POS which in turn is a subclass of an analog data item aDI which in turn forms a subclass of data item DI as illustrated in FIG. 4. An asset ASS can be connected to (ct) to another asset ASS. A data item DI has an asset as a physical source (hps). An axis AX is connected to (ct) to a motor MOT.

In the illustrated example of FIG. 4, a model instance model MIM fragment is shown. An instance millmach-123 of a milling machine that has part axis 1, which is an instance of linear axis lAX and which has the attribute name="X" is shown in FIG. 4. The axis 1 has properties: axis1.Enc2ActPos, which forms an instance of actual position aPOS and property axis1.ComTorque, which is an instance of CommandedTorque cTOR. The axis1.ComTorque has further attributes such as unit=Nm and address="/nck/servodata/nckServoDataCmdTorque64[1]", which is a SINUMERIK-specific. The model management component MMC of the backend BE is the component which is adapted to manage the lifecycle of both the generic machine tool model GMTM and the machine instance models MIMs. Besides CommandedTorque cTOR, actual-Torque aTOR form a subclass of Torque TOR. Further, commandedPosition cPOS and actualPosition aPOS form subclasses of Position POS as illustrated in FIG. 4.

The model management component MMC of the backend BE can offer the following set of functionalities. The model management components MMCs can be used to generate and/or update the generic machine tool model GMTM. Further, it can be used to generate and/or update the mappings from controller-specific addresses to the generic machine tool model GMTM. Moreover, the model management component MMC can be used to generate and/or update mappings from industrial machine tool data standards to the generic machine tool model GMTM and/or machine instance models MIMs. The generation and/or update of the models is normally performed by the backend platform owner PO in the backend BE.

The model management component MMC can also be used for parsing the input and translating it into the part of the machine instance model MIM and storing it into the memory of the backend BE. The required input can comprise the machine tool data report MTDR provided by the edge computing device ECD. The machine tool data report MTDR can be provided either in a controller-specific data reporting format (e.g. data archives and dynamic data specification for SINUMERIK or in an industry standard format such as OPC-UA Companions by MTConnect and VDW).

The required input can further comprise mappings from the received reporting format to the generic machine tool model GMTM. These can be stored either in the backend or together with the MTDR.

Figure 5:
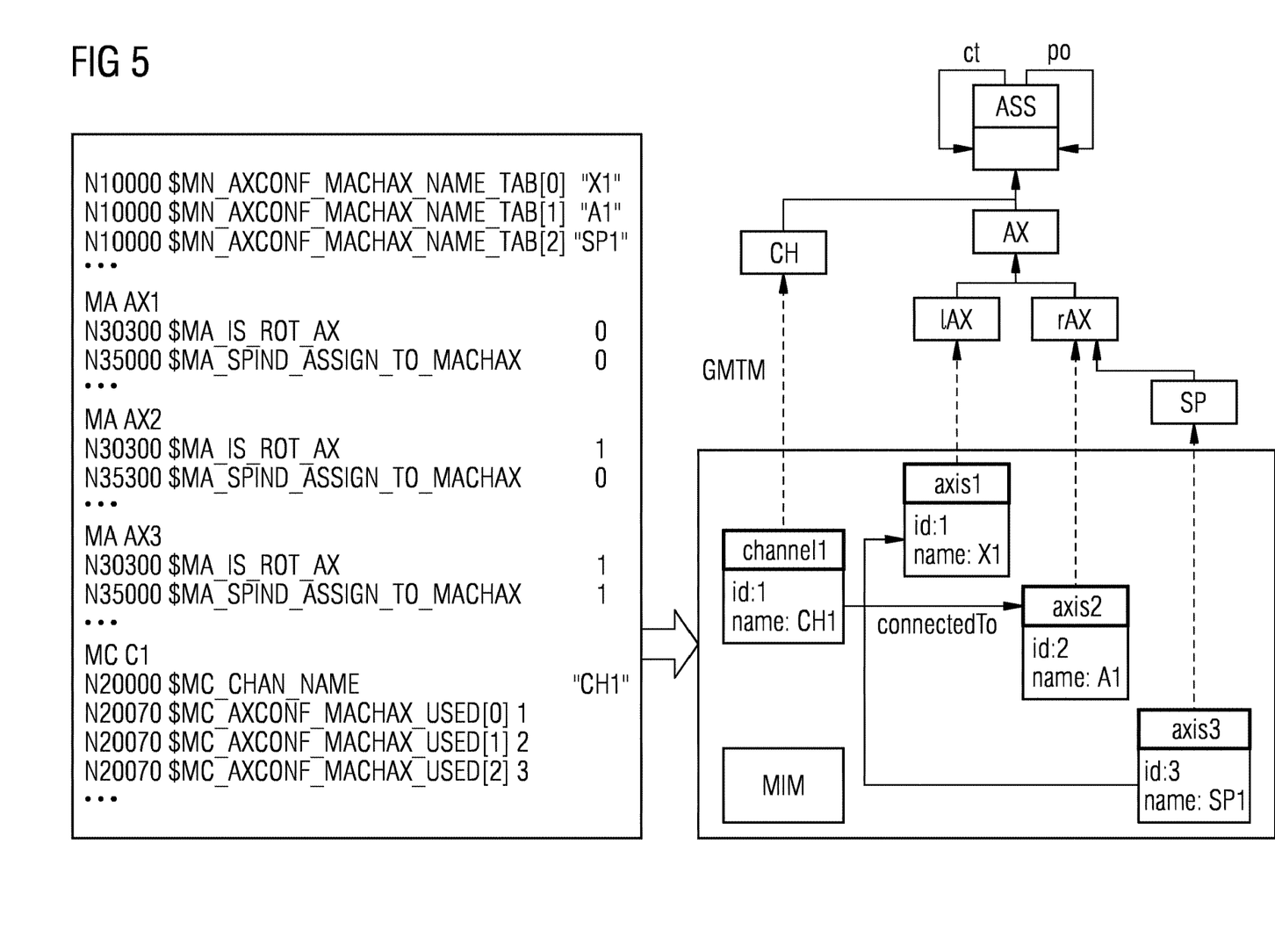
FIG. 5 shows an example for the automatic generation of a machine instance model from a SINUMERIK data archive.

An example for the automatic generation of a machine configuration instance model MIM from a SINUMERIK data archive is illustrated in FIG. 5. The SINUMERIK data archive illustrated on the left side can be part of a machine tool data report MTDR of a machine tool MT which is transformed into a machine instance model MIM of the machine tool MT instantiating the generic machine tool model GMTM as shown in FIG. 5. Channel1 is an instance of channel CH being a subclass of asset ASS, linear Axis lAX and rotary Axis rAX are both subclasses of axis AX forming a subclass of asset ASS. Axis3 is an instance of spindle SP being a subclass of rotary axis rAX.

The transformation illustrated in FIG. 5 can be performed in a possible embodiment by a processor of the model management component MMC.

The model management component MMC can comprise an interface tool which allows for an enrichment of the machine instance models MIMs of the different machine tools MTs or of the enrichment of a family of machine instance models MIMs with OEM-specific data by the OEM.

Figure 6:
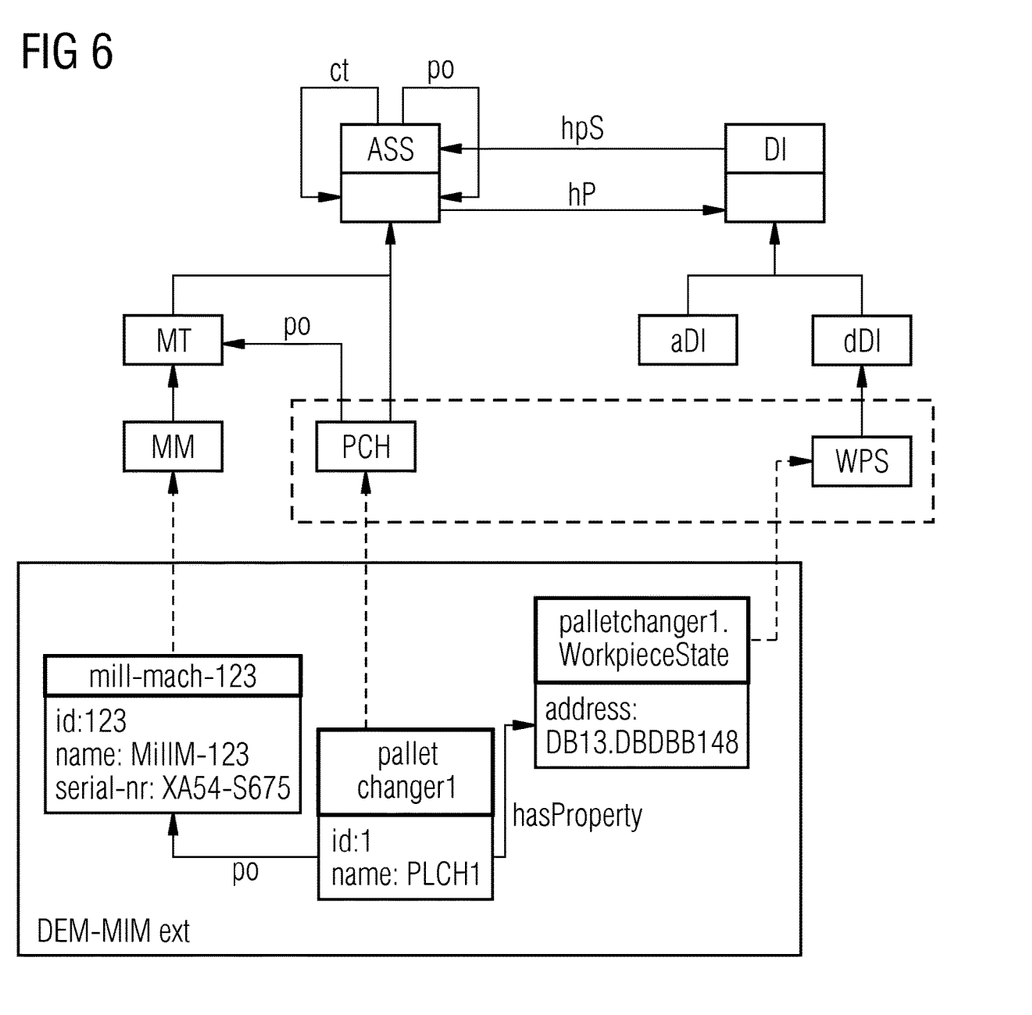
FIG. 6 illustrates an enrichment of a machine instance model of a machine tool with OEM-specific data.

For example, machine tool data stored in a PLC can be addressed in an OEM-specific manner wherein only the respective OEM can understand the semantics of these data. For example, as illustrated in FIG. 6, the OEM can insert a data item addressed with DB13.DBDBB148 into the machine instance model MIM. This is an instance of workpiece state WPS and can be defined as a property of a respective instance of a pallet changer PCH as shown in FIG. 6. If that instance is not present in the machine instance model MIM it needs to be added as well. The model management component MMC of the backend BE can also comprise an interface tool for the enrichment of the generic machine tool model GMTM via the OEM if necessary. For example, if machine component classes (such as "PalletChanger") or data item classes (such as "WorkpieceState") are required for the generation of the instances are not present in the generic machine tool model GMTM, the OEM can generate its own extension of the generic machine tool model GMTM. The OEM can for instance introduce the missing classes and align them with the generic machine tool model GMTM as shown in the example illustrated in FIG. 6.

oem1: PalletChanger (PCH) subclassOf mt: Asset ASS
    oem1: PalletChanger (PCH) partOf mt: MachineTool MT
    oem1: WorkpieceState subclassOf mt: DiscreteDataitem dDI The OEM can also decide to keep this model extension private. In this embodiment, only applications with the access to the OEM-specific model can also use the OEM-specific data. Alternatively, the OEM can also send a request to the owner of the generic machine tool model GMTM who can extend the generic machine tool model GMTM with the proposed classes.

As also illustrated in FIG. 2, the generic machine tool model GMTM stored in the database of the model management component MMC can also be extended via a generic application model gAPPM provided by an application management component APPMC.

For example, if App "XYZ" (app XYZ-AxisLoadIndex) computes the load index of all machine axes, the application generic model gAPPM can contain the following extensions of the generic machine tool model GMTM:

mt: Axis hasProperty app: XYZ-AxisLoadIndex
    app: XYZ-AxisLoadIndex subclassOf mt: DiscreteDataItem In this way, the application announces its extension of the model so that other applications can subscribe to its output in a generic manner. This extension can be initiated by the application management component APPMC and application deployment component APPDC.

The machine instance models MIMs for the machine tools MTs on which the industrial application APP is to be deployed can also be enriched by the application deployment component APPDC as illustrated in FIG. 2. This can be done by applying rules specified for the application, for every instance a of axis in the machine tool MT generate a new property a.XYZ-AxisLoadIndex of type XYZ-Axis-LoadIndex. This extension can be initiated by the application management (APPMC) and deployment components (APPDC).

Different functionalities can be applied in case that lifecycle change is triggered. For instance, if a new machine tool data report MTDR is extracted by the edge computing device ECD a new machine instance model MIM can be generated. Further, applications that are deployed statically can apply the enrichment of the machine instance models MIMs (for example, the number of axes may change).

If a new application is published it is possible to publish the application generic model extension used for extending the generic machine tool model GMTM.

Further, if a new application is deployed on the edge computing device ECD of the machine tool MT an application instance model MIM can be generated.

If the generic machine tool model GMTM is not sufficient to describe a new configuration the interface tool of the model management component MMC can be used to enrich and/or extend the machine instance model MIM.

The application management component APPMC and the application development component APPDC allow to develop and publish via the backend system BE generic applications gAPP that can provide reusable functionality for different manufacturing environments ME. The application can contain in addition to the software the following information or data:

The application can comprise a generic model extension. This can indicate how the published application extends the upper layer model. For example, if an application XYZ is created that measures the load on certain machine axis it can indicate that it extends the generic model by adding the parameter XYZ-AxisLoadIndex to the axis class.

The application can further comprise rules for extending the machine instance model MIM. This indicates how to extend instances of the generic machine tool model GMTM. In the previous example, it can indicate to which particular objects of the class axis in a model instance the parameter XYZ-AxisLoadIndex has to be assigned.

The application can further contain generic data requirements gR. These include a description of data requirements, for example a list of data points which can be utilized by the application, referring to them by the generic machine tool model GMTM, for example by using queries Q, e.g. SPARQL queries.

The application can further contain other dependencies. These other dependencies can include dependencies in terms of system services, other applications, resources, machine details, etc. which are required by the respective application.

For example, the application can describe data requirements in a generic manner without knowing how many axes the machine tool MT does have. Further, the application can describe how the dynamic data is addressed on specific machines. For example, the application can subscribe to the torque data for all axes.

Firstly, by the SPARQL query AXES_CONFIG
SELECT ?axis ?axis_name ?axis_type
WHERE {?axis rdf:type/rdfs:subclassOf* mt:Axis.
?axis mt:name ?axis_name
?axis rdf:type ?axis_type.}

The app queries the static axes configuration data for all axes: their names (e.g. X, Y) and types (e.g. Linear/Rotary/Spindle).

Moreover, by the query AXES_COMMANDED_TORQUE
SELECT ?axis, ?address, ?unit
WHERE
{?axis rdf:type/rdfs:subclassOf* mt:Axis.
?axis mt:hasProperty ?axis_torque.
?axis_torque mt:address ?address.
?axis_torque mt:unit ?unit.
?axis_torque rdf:type mt:CommandedTorque}

The application subscribes to the axes torque data as well as to the context of these data, i.e. which axis it is related to and in which units it is measured.

The lifecycle of these artifacts can be managed by the backend BE after submission. Both can be used in the application deployment process as well as in the model lifecycle process.

Users including manufacturers, operators or owners of machine tools MT are able to deploy via the backend system BE the industrial applications to specific machine tools MT in specific manufacturing environments ME. When this happens, the steps of the flowchart illustrated in FIG. 7 are performed at the backend BE.

In a step S70, the application deployment is triggered. In a step S71, dependencies are checked, i.e. it is checked whether the application is ready to be deployed on the particular edge computing device ECD. It is checked whether all necessary requirements are fulfilled. These include physical requirements, software requirements and/or resource requirements. The physical requirements are for instance the model and type of the associated machine model that are required by the respective application. The software requirements can for instance include dependencies on other applications or on specific services or service versions provided by the edge computing device ECD. The resource requirements can comprise available physical memory requirements or CPU requirements on the device. If some of the dependencies are not fulfilled the backend BE can attempt to deploy them although not all requirements are fulfilled. Otherwise, the deployment step may fail.

Figure 7:
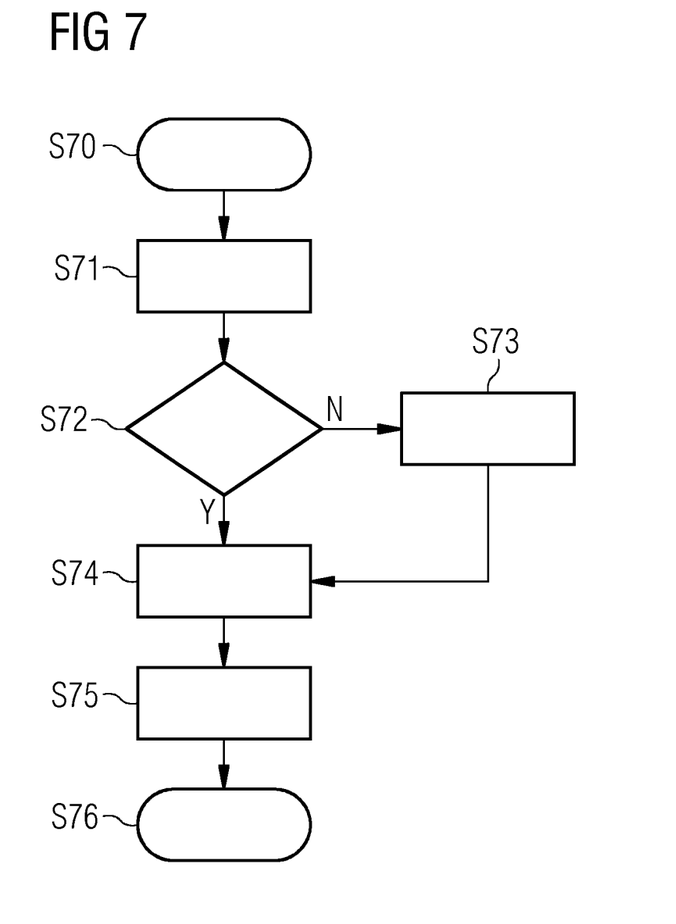
FIG. 7 shows a flowchart for illustrating a possible exemplary implementation for deployment of an instantiated industrial application on an edge computing device.
Figure 8:
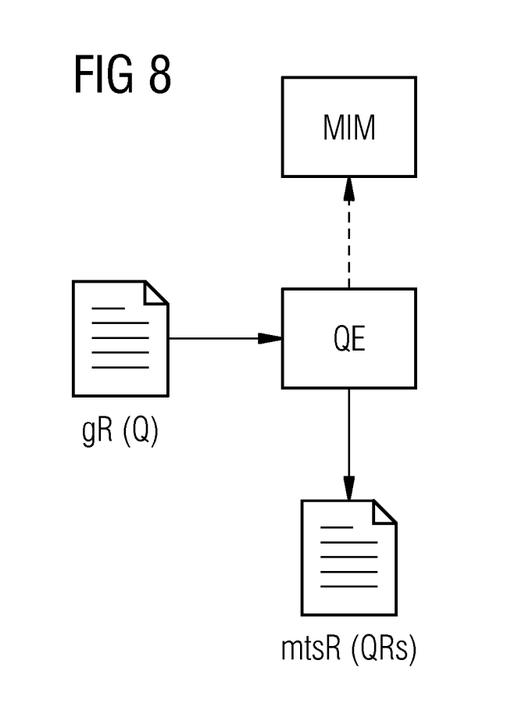
FIG. 8 shows schematically the evaluation of queries by a query engine using a machine instance model of the machine tool to generate query results forming machine tool specific requirements.

As illustrated in FIG. 7, it is decided in step S72, whether the dependencies have been fulfilled or not. If the dependencies are satisfied a resolution of static data requirements is performed in step S74. If the dependencies are not satisfied, the deployment of the dependencies is triggered in step S73. The application developer D can provide a generic description of data points, for instance in the form of queries Q to the generic model. For any running instance of the application, all generic data requirements can be converted to data requirements specific to the machine tool MT and edge computing device ECD where the application is being deployed. These specific requirements can include for example the physical address where the data has to be read on the particular machine of interest, and also a specific protocol which has to be used to communicate with the machine tool MT. This conversion step can take place by evaluating the queries Q on a query engine QE of the backend BE that can use the machine instance model MIM corresponding to the edge computing device ECD of the machine tool MT of interest as illustrated also in FIG. 8. Generic data requirements gR of the generic application can comprise a list of queries Q evaluated by the query engine QE using the machine instance model MIM of the machine tool MT to generate query results QRs forming machine tool specific requirements mtsR as shown schematically in FIG. 8. The generic industrial application can be instantiated by extending its configuration data with the machine tool specific requirements mtsR to provide an instantiated industrial application for the respective machine tool MT.

During deployment, it can be decided which of the generic data requirements gR in the form of queries Q is to be resolved into specific requirements and which ones of the generic data requirements gR are not resolved before deployment and left for the edge computing device ECD to be resolved during application runtime. The resolution of the generic data requirements gR into specific data requirements during deployment is more efficient as it does not consume edge device resources. However, the resolution during deployment is less flexible as it does not allow the running application to react on changes in the model. In a possible embodiment, the backend BE can select which generic data requirements gR are resolved statically (e.g. before deployment) based on the knowledge about the likelihood for the requested parameters to change during application runtime.

The machine tool specific requirements mtsR (potentially together with the generic data requirements gR to be resolved at runtime) can be deployed in step S75 of FIG. 7 along with the application and can be used by the edge computing device ECD to acquire specific data values from the machine tool MT and to provide the acquired data to the application via a machine interface component on the edge computing device ECD which implements communication with the actual machine tool MT using a specific protocol.

Figure 9:
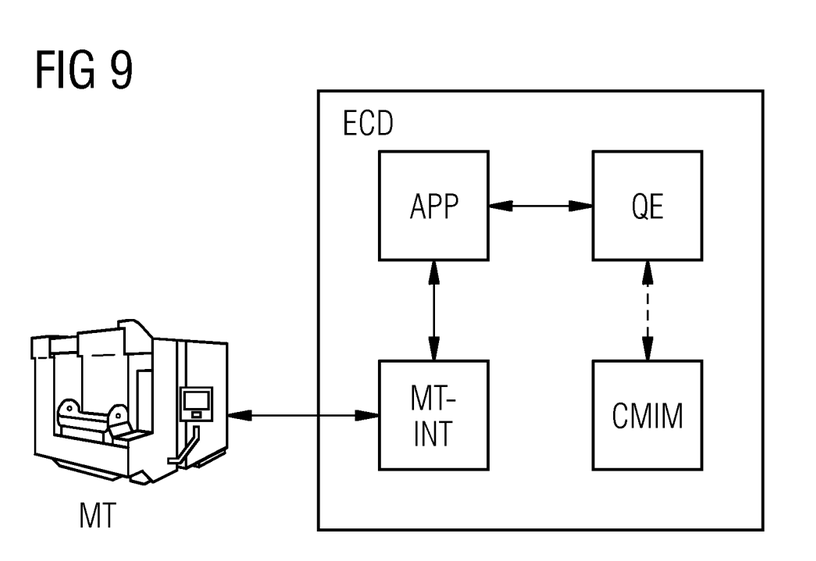
FIG. 9 illustrates schematically the deployment of an instantiated industrial application on an edge computing device of a machine tool.

In some cases, the queries Q are not statically resolved at deployment time but they are resolved at runtime of the application, i.e. when the application APP is executed on a processor of the edge computing device ECD. In a possible embodiment, the edge computing device ECD can contain a local copy of the machine instance model MIM as well as a local query engine QE as also illustrated in FIG. 9. The edge computing device ECD can comprise a local memory which contains a local copy of the machine model instance cMIM. Further, the edge computing device ECD can comprise a local query engine QE as shown in FIG. 9. The local query engine QE can be used by the application APP to resolve the generic queries Q into data points of the specific machine tool MT and/or from another application using an appropriate addressing mechanism. These can then be forwarded to a machine tool interface component MT-INT of the edge computing device ECD.

In a possible embodiment, data quality predicates can be used to define dynamic data requirements. If such predicates are provided by the applications APP at runtime, then the query engine QE is not only used to resolve the required data points for the application but also does match the required data qualities to the available data sources like machine sensors, video cameras, audio input devices and so on.

Attributes of data quality can be defined by the application as predicates over sets of time series data over time such as the acquisition frequency of data coming from machine sensors or provided by other applications. Further, the predicates can comprise a probability of uncertainty regarding data correctness. The predicates can also relate to data precision or to information about missing data points in the time series data. Further, the predicates can refer to currentness of the received data and/or to the amount or range of historic data availability. The predicates can also comprise data security constraints that can be defined in a static manner (e.g. role-based access control of applications to data) or dynamic manner (e.g. based on a need-to-know-context of an application which is only allowed to access data in a pre-defined context that is continuously being assessed during data delivery of the application).

To harmonize the overall data point resolution process, semantics of the data quality attributes and predicates can be added to the generic model and managed in the instance model. This allows incorporating the data quality requirements of applications when resolving data points from them based on the local model instance. For example, when asking a query engine QE for resolving data points based on the model instance each application can provide one or multiple of the attributes as optional predicates for resolving the required data points according to their principle availability and provided quality attributes. The query engine QE can match the defined quality requirements by applying the predicates to the model instance that manages the data quality attributes of incoming data over time.

This implies that the running application can potentially depend on a local machine instance model MIM stored in a local memory of the edge computing device ECD as illustrated in FIG. 9. The local machine instance model MIM can be managed at the backend BE and may be changed by multiple parties. Accordingly, a mechanism is implemented to update the local machine instance model MIM on the edge computing device ECD whenever the corresponding machine instance model MIM on the backend BE is updated. This process can be performed by the backend BE.

When a machine instance model MIM is changed, the backend BE can deploy (either automatically or manually by the machine operator or machine owner) the updated machine model instance on the edge computing device ECD. Subsequently, it is checked by the backend BE for every individual application currently deployed on the edge computing device ECD whether it has to be re-deployed, including whether the dependencies or data requirements are still satisfied. In case there is a change on the statically resolved data requirements, an application re-deployment can be performed.

Figure 10:
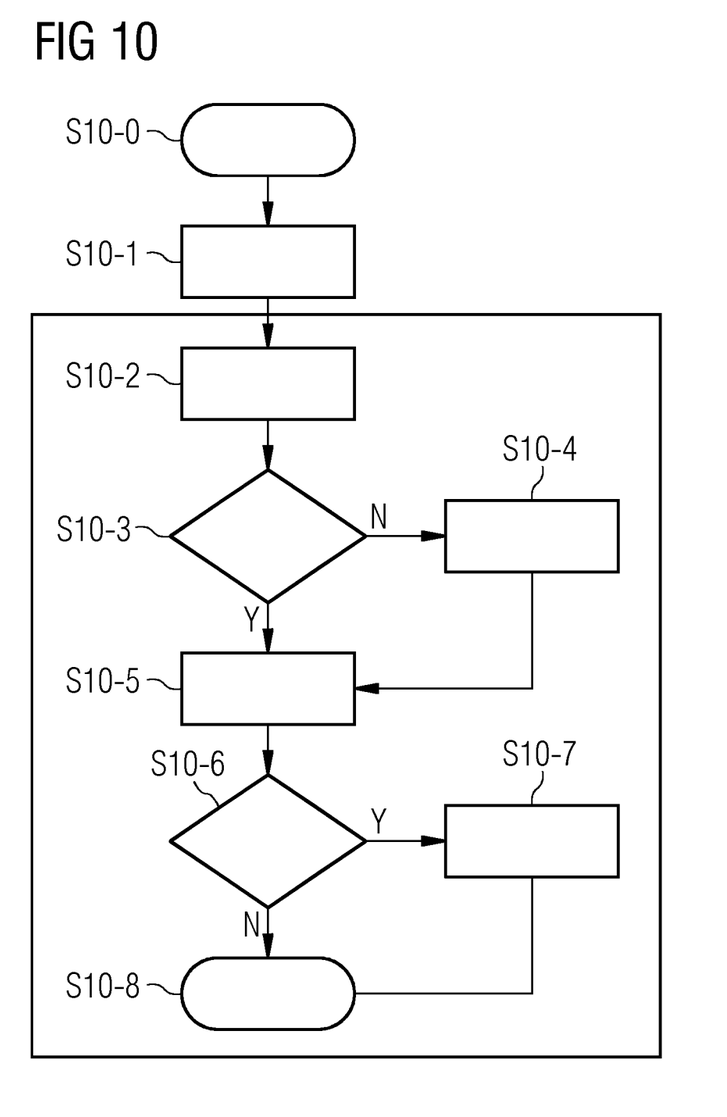
FIG. 10 shows a flowchart of a possible exemplary implementation of a deployment process.

As illustrated in FIG. 10, if a machine instance model MIM is updated in step S10-0 the updated machine instance model MIM can be deployed in step S10-1, wherein for each installed application steps similar to the process illustrated in FIG. 7 are performed. In step S10-2, the dependencies are checked similar to step S71 in FIG. 7. In step S10-3, it is decided whether the checks have been performed successfully. If the dependencies are fulfilled resolution of static requirements is performed in step S10-5. Otherwise, the deployment of dependencies is triggered in step S10-4. In step S10-6, it is decided whether a change has been performed or not. If a change has occurred an application binary and the configuration data is deployed on the edge computing device ECD in step S10-7. The process ends in step S10-8.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for deployment of an industrial application on an edge computing device, ECD, connected to a controller of a machine tool, MT,
the method comprising the steps of:
(a) providing a generic machine tool model, GMTM, of machine tool components;
(b) transforming a machine tool data report, MTDR, extracted by the edge computing device, ECD, from the controller of the machine tool, MT, into a machine instance model, MIM, of the machine tool, MT, instantiating the generic machine tool model, GMTM;

(c) converting generic data requirements, gR, of a generic industrial application into machine tool specific requirements, mtsR, using the machine instance model, MIM, of the machine tool, MT;

(d) providing an instantiated industrial application for the machine tool, MT, by instantiating the generic industrial application by extending its configuration data with the machine tool specific requirements, mtsR; and (e) deploying the instantiated industrial application on the edge computing device, ECD, of the machine tool, MT.

2. The method according to claim 1, wherein the machine instance model, MIM, of the machine tool, MT, is enriched with OEM specific data of an Original Equipment Manufacturer, OEM, of the respective machine tool, MT.

3. The method according to claim 1, wherein the generic machine tool model, GMTM, and the machine instance models, MIMs, of the machine tools, MTs, are stored in a memory of a model management component, MMC, within a backend to which edge computing devices, ECDs, are connected.

4. The method according to claim 1, wherein the generic machine tool model, GMTM, provides a schema adapted to describe configurations of machine tool components, kinematics and associated data items.

5. The method according to claim 1, wherein the generic data requirements, gR, of the generic industrial application comprise queries, Q, evaluated by a query engine, QE, using the enriched machine instance model, MIM, of the machine tool, MT, to generate query results, QRs, forming machine tool specific requirements, mtsR.

6. The method according to claim 1, wherein the generic data requirements, gR, of the generic industrial application converted into machine tool specific requirements, mtsR, using the enriched machine instance model, MIM, of the machine tool, MT, comprise static data requirements converted at a deployment time and dynamic data requirements converted during application runtime when the industrial application is executed on a processor of the edge computing device, ECD.

7. The method according to claim 1, wherein the machine tool data report, MTDR, extracted by the edge computing device, ECD, from the controller of the machine tool, MT, comprises a predefined format including a controller specific data reporting format or an industrial standard format and comprises mappings from the predefined format to the generic machine tool model, GMTM, stored in the database of the model management component, MMC, of the backend.

8. The method according to claim 1, wherein the generic machine tool model, GMTM, stored in the memory of the backend is extended by a generic application model of the generic industrial application.

9. The method according to claim 1, wherein the machine instance model, MIM, of the machine tool, MT, is enriched by applying rules specified in the generic industrial application.

10. The method according to claim 1, wherein the instantiated industrial application with its configuration data extended with the machine tool specific requirements, mtsR, are deployed on the edge computing device, ECD, of the machine tool, MT, where the machine tool specific requirements, mtsR, and the generic data requirements, gR, are used by the edge computing device, ECD, to acquire data from data sources of the machine tool, MT, via a machine tool interface of the edge computing device, ECD.

11. The method according to claim 1, wherein a copy of the machine instance model, MIM, of a machine tool, MT, is stored in a local memory of the edge computing device, ECD, of the respective machine tool, MT, wherein the machine instance model, MIM, copy is used by the industrial application to convert generic data requirements into machine tool specific requirements, mtsR, wherein the machine instance model, MIM, copy is updated whenever the machine instance model, MIM, of the machine tool, MT, stored in the memory of the model management component, MMC, is changed.

12. The method according to claim 1, wherein data quality predicates are used to define dynamic data requirements of the industrial application with respect to data acquired by the edge computing device, ECD, from data sources of the machine tool, MT, wherein the data quality predicates comprise data acquisition frequency, probability of data correctness, data precision, data completeness, data currentness, range of historic data availability and data security constraints.

13. The method according to claim 1, wherein generic data requirements, gR, of a generic industrial application expressed in terms of the generic machine tool model, GMTM, are converted into machine tool specific requirements, mtsR, including data points and data protocols of the machine tool, MT, and its controller and its edge computing device, ECD.

14. The method according to claim 1, wherein the instantiated industrial application is deployed on the edge computing device, ECD, of the machine tool, MT, after it has been successfully checked that the machine tool specific requirements, mtsR, are fulfilled by the respective edge computing device, ECD.

15. A deployment platform for deployment of an industrial application on an edge computing device, ECD, connected to the controller of a machine tool, MT, the deployment platform comprising:

a model management component, MMC, adapted to instantiate a generic machine tool model, GMTM, stored in a memory to provide a machine instance model, MIM, of the respective machine tool, MT, on the basis of a machine tool data report, MTDR, received by the model management component, MMC, from the edge computing device, ECD, of the respective machine tool, MT, and further adapted to convert generic data requirements, gR, of a generic industrial application into machine tool specific requirements, mtsR, using the machine instance model, MIM, of the respective machine tool, MT, wherein an instantiated industrial application for the machine tool, MT, is provided by instantiating the generic industrial application by extending its configuration data with machine tool specific requirements, mtsR, or by translating a subset or all requirements at runtime or the machine tool, MT, wherein the instantiated industrial application is deployed by the model management component, MMC, of the deployment platform on the edge computing device, ECD, of the respective machine tool, MT.

* * * * *